(12) United States Patent
Tachiwana

(10) Patent No.: US 7,501,369 B2
(45) Date of Patent: *Mar. 10, 2009

(54) OPTICAL GLASS AND PROCESS FOR THE PRODUCTION OF OPTICAL PRODUCTS

(75) Inventor: Kazuo Tachiwana, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/826,424

(22) Filed: Jul. 16, 2007

(65) Prior Publication Data

US 2007/0262480 A1  Nov. 15, 2007

Related U.S. Application Data

(60) Continuation of application No. 10/961,078, filed on Oct. 12, 2004, now abandoned, which is a division of application No. 09/863,263, filed on May 24, 2001, now Pat. No. 6,818,578.

(30) Foreign Application Priority Data

May 31, 2000  (JP)  ............................. 2000-163049

(51) Int. Cl.
C03C 3/068 (2006.01)
C03C 3/155 (2006.01)
C03C 3/095 (2006.01)

(52) U.S. Cl. ............................. 501/78; 501/51; 501/63; 501/64; 501/65; 501/79; 501/903

(58) Field of Classification Search .................... 501/51, 501/63, 77, 78, 79, 64, 65, 903
See application file for complete search history.

(56) References Cited

U.S. PATENT DOCUMENTS 2,150,694 A  3/1939  Morey 3,563,773 A  2/1971  Bromer et al.
4,120,732 A  10/1978  Komorita et al.
4,166,746 A  9/1979  Ishibashi et al.
6,818,578 B2  11/2004  Tachiwama
2005/0209085 A1*  9/2005  Endo ........................... 501/50

FOREIGN PATENT DOCUMENTS

| DE | OFF 19 26 959 | 12/1969 |
| DE | OFF 34 31 215 A1 | 3/1985 |
| GB | 1 299 879 | 12/1972 |
| JP | 53-4023 | 1/1978 |
| JP | 54-6042 | 3/1979 |
| JP | 54-90218 | 7/1979 |
| JP | 57-38342 | 3/1982 |
| JP | 06-305769 | 11/1994 |
| JP | H11-343126 | 12/1999 |

OTHER PUBLICATIONS

English Translation of Japanese Patent 53-4023.
English Translation of Japanese Patent 54-090218.

* cited by examiner

*Primary Examiner*—Jerry Lorengo
*Assistant Examiner*—Elizabeth A Bolden
(74) *Attorney, Agent, or Firm*—Nixon & Vanderhye P.C.

(57) ABSTRACT

An optical glass having high-refractivity and low-dispersion optical properties and having a low glass transition point so that a heat-treating furnace can be operated for a long period of time. The optical glass has a refractive index nd of at least 1.875, an Abbe's number νd of at least 39.5 and a glass transition point Tg of 700° C. or lower, and contains at least one of $La_2O_3$, $Gd_2O_3$, $Y_2O_3$ or $Yb_2O_3$ and at least one of $ZrO_2$, $Ta_2O_5$ or $Nb_2O_5$, with a weight ratio of the total content of $La_2O_3$, $Gd_2O_3$, $Y_2O_3$ and $Yb_2O_3$ to the total content of $SiO_2$ and $B_2O_3$ of from 3.2 to 5 and the weight ratio of the total content of $ZrO_2$, $Ta_2O_5$ and $Nb_2O_5$ to the total content of $SiO_2$ and $B_2O_3$ is from 1.1 to 1.5.

15 Claims, No Drawings

OPTICAL GLASS AND PROCESS FOR THE PRODUCTION OF OPTICAL PRODUCTS

This application is a continuation of application Ser. No. 10/961,078, filed Oct. 12, 2004 now abandoned, which in turn is a divisional of Ser. No. 09/863,263, filed May 24, 2001, now U.S. Pat. No. 6,818,578.

TECHNICAL BACKGROUND

1. Field of the Invention

The present invention relates to an optical glass, a glass preform made of it, an optical product and a process for the production of the optical product. More specifically, it relates to an optical glass which has high-refractivity and low-dispersion optical properties, has a low glass transition point and allows the stable operation of a heat-treating furnace for a long period of time, a glass preform which is made of the above optical glass and suitable for the formation of various optical products, an optical product made of the above optical glass, and a process for the production of the above optical product.

2. Explanation of Related Art

Conventionally, an optical glass having high-refractivity and low-dispersion optical properties contains a large amount of $La_2O_3$, $Gd_2O_3$, $Y_2O_3$, $Ta_2O_5$, $ZrO_2$, etc., for attaining a high refractive index and a low dispersion property as is shown, for example, in JP-A-54-90218 and JP-B-54-6042, and glass-network-forming components such as $B_2O_3$ and $SiO_2$ are contained in a small amount, so that the above optical glass is extremely highly liable to undergo crystallization. Since a glass that can be stably produced is limited in compositional range, commercially available optical glasses having a high refractive index and a low dispersion have a glass transition point Tg of over 720° C. Table 1 shows properties of high-refractivity low-dispersion optical glasses shown in brochures supplied by optical glass manufacturers.

TABLE 1

| | Refractive index [nd] | Abbe's number [vd] | Glass transition point [Tg] (° C.) |
|---|---|---|---|
| A | 1.88300 | 40.8 | 730 |
| B | 1.88067 | 41.01 | 758 |
| C | 1.88300 | 40.8 | 738 |

Conventional high-refractivity low-dispersion glasses have a very high temperature for viscous flows as is typically shown by glass transition points Tg, and for example, annealing treatment thereof has required a temperature of 710° C. or higher. Generally, most of furnaces for glass annealing are made of a stainless steel plate, and this material has a deformation temperature around 700° C. When the annealing is carried out at a temperature over 710° C., therefore, there is caused a problem that the above stainless steel plate undergoes deformation, so that it is difficult to operate the furnace for a long period of time.

Further, the production of a lens material by re-heat pressing also requires a very high temperature, which causes a heat-treating furnace to deteriorate sooner and hinders stable production.

Meanwhile, when a glass has a glass transition point Tg of 700° C. or lower, stable production has been achieved without causing any special load on the operation of facilities.

SUMMARY OF THE INVENTION

Under the circumstances, it is a first object of the present invention to provide an optical glass that has high-refractivity low-dispersion optical properties, has a low glass transition point and allows the stable operation of a heat-treating furnace for a long period of time.

It is a second object of the present invention to provide a glass preform that is made of the above optical glass and is suitable for forming various optical products, and an optical product made of the above optical glass.

It is a third object of the present invention to provide a process for efficiently producing an optical product made of the above optical glass.

For developing optical glasses having the above desirable properties, the present inventors have made diligent studies with regard to effects of compositions of components constituting glasses on optical properties, thermal properties and devitrification resistance. As a result, it has been found that an optical glass having high-refractivity and low-dispersion optical properties and having a glass transition point of 700° C. or lower can be obtained by controlling the ratio of the total content of $La_2O_3$, $Gd_2O_3$, $Y_2O_3$ and $Yb_2O_3$, and the ratio of the total content of $ZrO_2$, $Ta_2O_5$ and $Nb_2O_5$, to the total content of $SiO_2$ and $B_2O_3$ such that the above ratios come into specific ranges, or by forming a glass having a specific glass composition, and that the first object of the present invention can be accordingly achieved.

Further, it has been also found that the above second object of the present invention can be achieved by a glass preform and an optical product made of the above optical glass each.

It has been further found that a optical product made of the above optical glass can be efficiently produced by employing a specific step, and that the above third object of the present invention can be accordingly achieved.

The present invention has been completed on the basis of the above findings. That is, the present invention provides:

(1) an optical glass having a refractive index nd of at least 1.875, an Abbe's number vd of at least 39.5 and a glass transition point Tg of 700° C. or lower (to be referred to as "optical glass I of the present invention" hereinafter), (2) an optical glass which is a borosilicate glass comprising at least one selected from $La_2O_3$, $Gd_2O_3$, $Y_2O_3$ or $Yb_2O_3$ and at least one selected from $ZrO_2$, $Ta_2O_5$ or $Nb_2O_5$, wherein the ratio (weight ratio) of the total content of $La_2O_3$, $Gd_2O_3$, $Y_2O_3$ and $Yb_2O_3$ to the total content of $SiO_2$ and $B_2O_3$ is from 3.2 to 5 and the ratio (weight ratio) of the total content of $ZrO_2$, $Ta_2O_5$ and $Nb_2O_5$ to the total content of $SiO_2$ and $B_2O_3$ is from 1.1 to 1.5, and which has a refractive index nd of at least 1.875 and an Abbe's number vd of at least 39.5 (to be referred to as "optical glass II of the present invention" hereinafter), (3) an optical glass which is a borosilicate glass comprising at least one selected from $La_2O_3$, $Gd_2O_3$, $Y_2O_3$ or $Yb_2O_3$, at least one selected from $ZrO_2$, $Ta_2O_5$ or $Nb_2O_5$ and ZnO, wherein the ratio (weight ratio) of the total content of $La_2O_3$, $Gd_2O_3$, $Y_2O_3$ and $Yb_2O_3$ to the total content of $SiO_2$ and $B_2O_3$ is from 2 to 5, the ratio (weight ratio) of the total content of $ZrO_2$, $Ta_2O_5$ and $Nb_2O_5$ to the total content of $SiO_2$ and $B_2O_3$ is from 0.5 to 3 and the ratio (weight ratio) of ZnO to the total content of $SiO_2$ and $B_2O_3$ is at least 0.14, and which has a refractive index nd of at least 1.875 and an Abbe's number vd of at least 39.5 (to be referred to as "optical glass III of the present invention" hereinafter), (4) an optical glass having a glass composition comprising, by % by weight, 3 to 10% of $SiO_2$, 7 to 15% of $B_2O_3$, 30 to 60% of $La_2O_3$, 2 to 8% of $ZrO_2$ and 13 to 19% of $Ta_2O_5$, wherein the total content of $SiO_2$ and $B_2O_3$ is 14 to 20% and the total content of the above components is at least 95% (to be referred to as "optical glass IV of the present invention" hereinafter), (5) a glass preform made of any one of the above glasses I to IV, (6) an optical product made of any one of the above glasses I to IV, (7) a process for the production of an optical product made of any one of the above optical glasses I to IV, which comprises the steps of melting raw materials for glass and directly press-molding a molten glass, and (8) a process for the production of an optical product, which comprises the steps of softening a glass preform made of any one of the above optical glasses I to IV under heat and press-molding the glass preform softened under heat.

PREFERRED EMBODIMENTS OF THE INVENTION

The optical glass of the present invention includes four embodiments, i.e., four optical glasses I to IV.

First, the optical glass I is a high-refractivity low-dispersion optical glass having a low glass transition point and having a refractive index nd of at least 1.875, an Abbe's number vd of at least 39.5 and a glass transition point Tg of 700° C. or lower.

The above optical glass I preferably includes a borosilicate glass containing at least one selected from $La_2O_3$, $Gd_2O_3$, $Y_2O_3$ or $Yb_2O_3$ and at least one selected from $ZrO_2$, $Ta_2O_5$ or $Nb_2O_5$, wherein the weight ratio of the total content of $La_2O_3$, $Gd_2O_3$, $Y_2O_3$ and $Yb_2O_3$ to the total content of $SiO_2$ and $B_2O_3$ is from 2 to 4, and the weight ratio of the total content of $ZrO_2$, $Ta_2O_5$ and $Nb_2O_5$ to the total content of $SiO_2$ and $B_2O_3$ is from 1 to 2.

In the composition of the above optical glass I, when the weight ratio of the total content of $La_2O_3$, $Gd_2O_3$, $Y2O_3$ and $Yb_2O_3$ to the total content of $SiO_2$ and $B_2O_3$ [$(La_2O_3+Gd_2O_3+Y_2O_3+Yb_2O_3)/(SiO_2B_2O_3)$] is less than 2, it is difficult to obtain an optical glass having a high refractive index and a high Abbe's number, which is one of the objects of the present invention. The content of ZnO that improves dispersion as compared with $La_2O_3$ and $Gd_2O_3$ is limited, and as a result, it is difficult to obtain an optical glass having a glass transition point sufficient for mass-productivity. On the other hand, when the above weight ratio exceeds 4, the devitrification resistance is poor, so that it is difficult to obtain a stably mass-producible glass. Therefore, the weight ratio of the total content of $La_2O_3$, $Gd_2O_3$, $Yb_2O_3$ and $Yb_2O_3$ to the total content of $SiO_2$ and $B_2O_3$ is preferably in the range of from 2 to 4, more preferably 3 to 4, still more preferably 3.1 to 3.7.

Further, when the weight ratio of the total content of $ZrO_2$, $Ta_2O_5$ and $Nb_2O_5$ to the total content of $SiO_2$ and $B_2O_3$ [$(ZrO_2+Ta_2O_5+Nb_2O_5)/(SiO_2+B_2O_3)$] is less than 1, it is difficult to obtain an optical glass having a high refractive index intended in the present invention and stability sufficient for mass-productivity. On the other hand, when it exceeds 2, the Abbe's number vd decreases, and it is difficult to obtain a low-dispersion optical glass that is an end product of the present invention. Therefore, the weight ratio of the total content of $ZrO_2$, $Ta_2O_5$ and $Nb_2O_5$ to the total content of $SiO_2$ and $B_2O_3$ is preferably in the range of from 1 to 2, more preferably 1.1 to 1.5, still more preferably 1.2 to 1.4.

The above optical glass I may further contain ZnO. The weight ratio of the content of ZnO to the total content of $SiO_2$ and $B_2O_3$ [$ZnO/(SiO_2+B_2O_3)$] is preferably more than 0 but not more than 2, more preferably more than 0 but not more than 1, particularly preferably 0.1 to 0.5. When the [$ZnO/(SiO_2+B_2O_3)$] weight ratio is in the above range, the glass can be imparted with properties of high refractivity and low dispersion (the dependency of a refractive index on a wavelength is small), and further, the glass can be improved in devitrification resistance and the temperature for the viscous flow thereof can be decreased.

As a preferred composition, the optical glass I of the present invention has a glass composition (a) comprising, by % by weight, 3 to 10% of $SiO_2$, 7 to 15% of $B_2O_3$, 0 to 5% of $GeO_2$, 0 to 15% of ZnO, 30 to 60% of $La_2O_3$, 0 to 30% of $Gd_2O_3$, 0 to 10% of $Y_2O_3$, 0 to 5% of $Yb_2O3$, 2 to 8% of $ZrO2$ and 13 to 19% of $Ta_2O_5$, wherein the total content of $SiO_2$, $B_2O_3$ and $GeO_2$ is 14 to 20% by weight, the total content of $B_2O_3$ and ZnO is at least 9% by weight and the total content of $La_2O_3$, $Gd_2O_3$, $Y_2O_3$ and $Yb_2O_3$ is 50 to 60% by weight, and further wherein the total content of the above components exceeds 95% by weight, and the composition contains 0 to 1% by weight of $Li_2O$ and 0 to 3% of $Nb_2O_5$.

In the above glass composition, $SiO_2$ is a glass-network-forming component essential for maintaining devitrification resistance, and the content thereof is preferably in the range of from 3 to 10% by weight. When the above content is less than 3% by weight, the devitrification resistance is insufficient. When it exceeds 10% by weight, the refractive index decreases. It is therefore difficult to obtain a high-refractivity optical glass that is an end product of the present invention. In view of the devitrification resistance and the refractive index, the content of $SiO_2$ is preferably in the range of from 6 to 9% by weight, more preferably 6.5 to 8.5% by weight.

$B_2O_3$ is a component having an effect as a network-forming oxide or an effect on meltability of the glass and a decrease in the temperature for viscous flow, and the content thereof is preferably in the range of from 7 to 15% by weight. When the content of $B_2O_3$ is less than 7% by weight, the effect on meltability of the glass and a decrease in the temperature for viscous flow is not sufficient. When it exceeds 15% by weight, the refractive index of the glass decreases. It is therefore difficult to obtain a high-refractivity glass that is an end product of the present invention. In view of the effect on the meltability of the glass and a decrease in the temperature for viscous flow and the refractive index, the content of $B_2O_3$ is more preferably in the range of from 9 to 12% by weight, still more preferably 9.5 to 11% by weight.

$GeO_2$ has the same effect as that of the above $SiO_2$, and may be incorporated in an amount in the range of from 0 to 5% by weight. When the content thereof exceeds 5% by weight, the devitrification resistance is liable to decrease.

The total content of the above $SiO2$, $B_2O_3$ and $GeO_2$ is preferably in the range of from 14 to 20% by weight. When the above total content is less than 14% by weight, the crystallization tendency increases in intensity, so that it is difficult to obtain an optical glass that can be stably produced. When it exceeds 20% by weight, the refractive index decreases, so that it is difficult to obtain a high-refractivity optical glass that is an end product of the present invention. In view of the crystallization tendency and the refractive index, the above total content of the above $SiO_2$, $B_2O_3$ and $GeO_2$ is more preferably in the range of from 16 to 19% by weight, still more preferably 16 to 18% by weight.

ZnO works to impart the glass with a high refractive index and low dispersion (the dependency of a refractive index on a wavelength is small), and further, it works to improve the glass in devitrification resistance and to decrease the temperature for the viscous flow. ZnO is therefore a component that is added as required after its amount is adjusted particularly by taking account of the amount of $B_2O_3$. Specifically, ($SiO_2$+$B_2O_3$):ZnO:($La_2O_3$+$Gd_2O_3$+$Y_2O_3$+$Yb_2O_3$): ($Nb_2O_5$+$ZrO_2$+$Ta_2O_5$) is adjusted to impart the glass with a refractive index nd of at least 1.875 and an Abbe's number vd of at least 39.5 and also with devitrification resistance feasible for glass production, and the total content of $B_2O_3$ and ZnO is adjusted preferably to at least 9% by weight, more preferably to at least 12% by weight, whereby the temperature for viscous flow can be decreased (Tg is 700° C. or lower). The content of ZnO is advantageously in the range of from 0 to 15% by weight. When the content of ZnO exceeds 15% by weight, the devitrification resistance may be insufficient in an attempt to obtain a refractive index in the intended range. On the other hand, when an attempt is made to maintain the devitrification resistance feasible for stable production, the refractive index decreases. It is therefore difficult to obtain a high-refractivity optical glass that is an end product of the present invention. The content of ZnO is more preferably in the range of 1 to 7% by weight, still more preferably 3 to 5% by weight.

$La_2O_3$ is an essential component for obtaining a high-refractivity low-dispersion optical glass, and the content thereof is preferably in the range of from 30 to 60% by weight. When the above content is less than 30% by weight, it is difficult to obtain an intended high-refractivity low-dispersion optical glass, and when it exceeds 60% by weight, the devitrification resistance decreases, so that it is difficult to obtain a glass that can be stably produced. The above content is more preferably in the range of from 37 to 48% by weight, still more preferably 40 to 45% by weight.

$Gd_2O_3$ may be incorporated in an amount range of from 0 to 30% by weight as a substitute for $La_2O_3$. When the above content exceeds 30% by weight, the devitrification resistance decreases, so that it is difficult to obtain a glass that can be stably produced. The above content is more preferably in the range of from 0 to 18% by weight, still more preferably 5 to 15% by weight.

$Y_2O_3$ and $Yb_2O_3$ may be also incorporated in the amount range of from 0 to 10% by weight and 0 to 5% by weight, respectively, as a substitute for the above $La_2O_3$. When the content of $Y_2O_3$ exceeds 10% by weight, or when the content of $Yb_2O_3$ exceeds 5% by weight, the devitrification resistance decreases, so that it is difficult to obtain a glass that can be stably produced. The content of $Y_2O_3$ is more preferably in the range of from 0 to 6% by weight, still more preferably 3 to 6% by weight. Further, the content of $Yb_2O_3$ is more preferably in the range of from 0 to 5% by weight, still more preferably 0 to 2% by weight.

The above $La_2O_3$ and the above $Gd_2O_3$, $Y_2O_3$ and $Yb_2O_3$ have similar effects on optical properties, and preferably, the total content of these components is in the range of from 50 to 60% by weight. When the above total content is less than 50% by weight, it is difficult to obtain a high-refractivity low-dispersion optical glass that is an end product of the present invention. When it exceeds 60% by weight, the devitrification resistance decreases, so that it is difficult to obtain a glass that can be stably produced. The above total content is more preferably in the range of from 51 to 58% by weight, still more preferably 54 to 56% by weight.

$ZrO_2$ is a component for attaining a high refractive index, and it exhibits an effect on improving the devitrification resistance when incorporated in a small amount. The content thereof is preferably in the range of from 2 to 8% by weight. When the above content is less than 2% by weight, it is difficult to obtain a high-refractivity optical glass, and $ZrO_2$ may fail to exhibit the effect on fully improving the devitrification resistance. When the above content exceeds 8% by weight, the devitrification resistance may rather decrease and the glass transition point may increases, so that it may be difficult to achieve the object of the present invention. The above content is more preferably in the range of from 4 to 8% by weight, still more preferably 4 to 6% by weight.

$Ta_2O_5$ is an essential component for attaining the high-refractivity, and the content thereof is preferably in the range of from 13 to 19% by weight. When the above content is less than 13% by weight, it is difficult to obtain a high-refractivity optical glass that is an end product of the present invention. When it exceeds 19% by weight, not only the devitrification resistance may decrease, but also the transmittance absorption end may shift toward a longer wavelength side. The above content is more preferably in the range of from 13 to 17% by weight, still more preferably 14 to 17% by weight.

In the optical glass I of the present invention, preferably, the total content of $SiO_2$, $B_2O_3$, $GeO_2$, ZnO, $La_2O_3$, $Gd_2O_3$, $Y_2O_3$, $Yb_2O_3$, $ZrO_2$ and $Ta_2O_5$ exceeds 95% by weight. When the above total content is less than 95% by weight, it is difficult to obtain an optical glass that satisfies all of the optical properties, the decrease in temperature for viscous flow and the devitrification resistance that are intended in the present invention. The above total content is more preferably at least 96% by weight, still more preferably at least 98% by weight.

In addition to the above components, the optical glass I of the present invention may contain $Nb_2O_5$, $WO_3$, $Al_2O_3$, $Bi_2O_3$, $Ga_2O_3$, BaO, Sro, CaO, Mgo, $Na_2O$, $K_2O$, $Li_2$ and $Sb_2O_3$ as required.

$Nb_2O_5$ and $WO_3$ are components for improving the devitrification resistance when incorporated in a small amount. Each of these components may be incorporated in an amount range of from 0 to 3% by weight. When the content of $Nb_2O_5$ exceeds 3% by weight, or when the content of $WO_3$ exceeds 3% by weight, the absorption of the glass in the shorter wavelength region is intensified, which causes the glass to be colored. The content of $Nb_2O_5$ is more preferably in the range of from 0 to 1.5% by weight, still more preferably 0.5 to 1.5% by weight. Further, the content of $WO_3$ is more preferably in the range of from 0 to 2% by weight, still more preferably 0 to 1% by weight.

$Bi_2O_3$ is a component having an effect on decreasing Tg when incorporated in a small amount, and it may be incorporated in an amount range of from 0 to 3% by weight. When the content of $Bi_2O_3$ exceeds 3% by weight, it decreases the devitrification resistance or causes the glass to be colored. The content thereof is more preferably in the range of from 0 to 2% by weight, still more preferably 0 to 1% by weight.

$Al_2O_3$ and $Ga_2O_3$ may work to improve the devitrification resistance in some cases when incorporated in a small amount. However, they also work to decrease the refractive index. The content of each of these components is preferably in the range of from 0 to 3% by weight. The content of $Al_2O_3$ is more preferably in the range of from 0 to 2.5% by weight, still more preferably 0 to 0.5% by weight.

BaO, SrO, CaO and MgO have an effect on promoting defoaming when used in the form of carbonates or nitrates as raw materials for the glass. However, when the total content of these components exceeds 3% by weight, the devitrification resistance decreases, so that it is difficult to obtain an optical glass that can be stably produced. The total content of BaO, SrO, CaO and MgO is therefore preferably in the range of from 0 to 3% by weight. The content of BaO is more preferably in the range of from 0 to 2% by weight, still more preferably 0 to 1% by weight. The content of SrO is more preferably in the range of from 0 to 2% by weight, still more preferably 0 to 1% by weight.

$Na_2O$, $K_2O$ and $Li_2O$ have an effect on decreasing the glass transition point Tg, and $Li_2O$ in particular has a very high effect on such. However, these components function as a great factor for decreasing the devitrification resistance and the refractive index. The total content of $Na_2O$, $K_2O$ and $Li_2O$ is preferably in the range of from 0 to 1% by weight. The content of $Li_2O$ is more preferably in the range of from 0 to 0.5% by weight.

$Sb_2O_3$ as a refining agent may be incorporated in an amount range of from 0 to 1% by weight. The above refining agent $Sb_2O_3$ may be replaced with other refining agent such as $SnO_2$. The content of $Sb_2O_3$ is preferably in the range of from 0 to 0.5% by weight.

As another preferred composition, the optical glass I of the present invention has a glass composition (b) comprising, by % by weight, 5 to 10% of $SiO_2$, 7 to 13% of $B_2O_3$, 0 to 5% of $GeO_2$, 0 to 15% of ZnO, 30 to 60% of $La_2O_3$, 0 to 30% of $Gd_2O_3$, 0 to 5% of $Y_2O_3$, 0 to 5% of $Yb_2O_3$, 2 to 8% of $ZrO_2$ and 13 to 19% of $Ta_2O_5$, wherein the total content of $SiO_2$, $B_2O_3$ and $GeO_2$ is 14 to 20% by weight, the total content of $B_2O_3$ and ZnO is at least 9% by weight and the total content of $La_2O_3$, $Gd_2O_3$, $Y_2O_3$ and $Yb_2O_3$ is 50 to 60% by weight, and further wherein the total content of the above components exceeds 95% by weight, the composition further contains, by % by weight, 0 to 3% of $Nb_2O_5$, 0 to 3% of $WO_3$, 0 to 3% of $Al_2O_3$, 0 to 3% of $Bi_2O_3$, 0 to 3% of $Ga_2O_3$ and 0 to 1% of $Sb_2O_3$, the total content of BaO, SrO, $K_2O$ and MgO is 0 to 3% by weight, and the total content of $Na_2O$, $K_2O$ and $Li_2O$ is 0 to 1% by weight.

The optical glass II of the present invention is a borosilicate glass comprising at least one selected from $La_2O_3$, $Gd_2O_3$, $Y_2O_3$ or $Yb_2O_3$ and at least one selected from $ZrO_2$, $Ta_2O_5$ or $Nb_2O_5$, wherein the weight ratio of the total content of $La_2O_3$, $Gd_2O_3$, $Y_2O_3$ and $Yb_2O_3$ to the total content of $SiO_2$ and $B_2O_3$ is from 3.2 to 5, and the weight ratio of the total content of $ZrO_2$, $Ta_2O_5$ and $Nb_2O_5$ to the total content of $SiO_2$ and $B_2O_3$ is from 1.1 to 1.5, the boroslicate glass having a refractive index nd of at least 1.875 and an Abbe's number vd of at least 39.5.

The weight ratio of the total content of $La_2O_3$, $Gd_2O_3$, $Y_2O_3$ and $Yb_2O_3$ to the total content of $SiO_2$ and $B_2O_3$ $[(La_2O_3+Gd_2O_3+Y_2O_3+Yb_2O_3)/(SiO_2+B_2O_3)]$ is from 3.2 to 5, preferably from 3.2 to 4.5, more preferably from 3.2 to 4, still more preferably from 3.2 to 3.5.

Further, the weight ratio of the total content of $ZrO_2$, $Ta_2O_5$ and $Nb_2O_5$ to the total content of $SiO_2$ and $B_2O_3$ $[(ZrO_2+Ta_2O_5+Nb_2O_5)/(SiO_2+B_2O_3)]$ is from 1.1 to 1.5, preferably from 1.2 to 1.3.

While the above optical glass II has a refractive index nd of at least 1.875 and an Abbe's number vd of at least 39.5, it can exhibit a glass transition point Tg of 700° C. or lower.

The optical glass III of the present invention is a borosilicate glass comprising at least one selected from $La_2O_3$, $Gd_2O_3$, $Y_2O_3$ or $Yb_2O_3$ and at least one selected from $ZrO_2$, $Ta_2O_5$ or $Nb_2O_5$ and containing ZnO, wherein the weight ratio of the total content of $La_2O_3$, $Gd_2O_3$, $Y_2O_3$ and $Yb_2O_3$ to the total content of $SiO_2$ and $B_2O_3$ is from 2 to 5, the weight ratio of the total content of $ZrO_2$, $Ta_2O_5$ and $Nb_2O_5$ to the total content of $SiO_2$ and $B_2O_3$ is from 0.5 to 3 and the weight ratio of ZnO to the total content of $SiO_2$ and $B_2O_3$ is at least 0.14, the borosilicate glass having a refractive index nd of at least 1.875 and an Abbe's number vd of at least 39.5.

In the optical glass III, the weight ratio of ZnO to the total content of $SiO_2$ and $B_2O_3$ $[ZnO/(SiO_2+B_2O_3)]$ is at least 0.14, preferably from 0.14 to 2, more preferably 0.18 to 1.5, still more preferably 0.2 to 1. Further, the weight ratio of the total content of $La_2O_3$, $Gd_2O3$, $Y_2O_3$ and $Yb_2O_3$ to the total content of $SiO_2$ and $B_2O_3$ $[(La_2O_3+Gd_2O_3+Y_2O_3+Yb_2O_3)/(SiO_2+B_2O_3)]$ is from 2 to 5, preferably 2.5 to 4.5, more preferably 3 to 3.5.

Further, the weight ratio of the total content of $ZrO_2$, $Ta_2O_5$ and $Nb_2O_5$ to the total content of $SiO_2$ and $B_2O_3$ $[(ZrO_2+Ta_2O_5+Nb_2O_5)/(SiO_2+B_2O_3)]$ is from 0.5 to 3, preferably from 0.8 to 2, more preferably from 1 to 1.5.

While the above optical glass III has a refractive index nd of at least 1.875 and an Abbe's number vd of at least 39.5, it can exhibit a glass transition point Tg of 700° C. or lower.

As a preferred glass composition, the above optical glasses II and III has a glass composition comprising, by % by weight, 3 to 10% of $SiO_2$, 7 to 15% of $B_2O_3$, 0 to 5% of $GeO_2$, 0 to 15% of ZnO, 30 to 60% of $La_2O_3$, 0 to 30% of $Gd_2O_3$, 0 to 10% of $Y_2O_3$, 0 to 5% of $Yb_2O_3$, 2 to 8% of $ZrO_2$ and 13 to 19% of $Ta_2O_5$, wherein the total content of $SiO_2$, $B_2O_3$ and $GeO_2$ is 14 to 20% by weight, the total content of $B_2O_3$ and ZnO is at least 9% by weight and the total content of $La_2O_3$, $Gd_2O_3$, $Y_2O_3$ and $Yb_2O_3$ is 50 to 60% by weight, and further wherein the total content of the above components exceeds 95% by weight and the glass composition contains 0 to 1% by weight of $Li_2O$ and 0 to 3% by weight of $Nb_2O_5$.

Each component of the above glass composition is as explained with regard to the glass composition (a) in the above optical glass I.

Further, the optical glass IV of the present invention is an optical glass having a composition comprising, by % by weight, 3 to 10% of $SiO_2$, 7 to 15% of $B_2O_3$, 30 to 60% of $La_2O_3$, 2 to 8% of $ZrO_2$ and 13 to 19% of $Ta_2O_5$, wherein the total content of $SiO_2$ and $B_2O_3$ is 14 to 20% by weight, and the total content of the above components is at least 95% by weight.

In the above optical glass IV, preferably, part of $La_2O_3$ is replaced with $Gd_2O_3$ and/or $Y_2O_3$, the content of $Gd_2O_3$ is 0 to 30% by weight, the content of $Y_2O_3$ is 0 to 10% by weight, and the glass has a glass transition point Tg of 700° C. or lower.

In the optical glass IV, preferably, ZnO is contained in an amount of 0 to 15% by weight and the total content of ZnO and $B_2O_3$ is at least 9% by weight. In the optical glass IV, particularly preferably, part of $La_2O_3$ is replaced with $Gd_2O_3$ and/or $Y_2O_3$, the content of $Gd_2O_3$ is 0 to 30% by weight, the content of $Y_2O_3$ is 0 to 10% by weight, the content of ZnO is 0 to 15% by weight, the content of $Nb_2O_5$ is 0 to 3% by weight, the content of $Li_2O$ is 0 to 1% by weight, and the glass has a glass transition point Tg of 700° C. or lower. In the optical glass IV, a reason for limitation of the amount range of each component and a preferred amount range of each component are as explained in the glass composition (a) in the above optical glass I.

According to the present invention, there is also provided a preform made of any one of the above optical glasses I to IV, and there is also provided an optical product made of any one of the above optical glasses I to IV.

The above glass preform can be produced by melting raw materials for any one of the above optical glasses I to IV and pre-shaping a molten glass by cold- or hot processing.

The above optical product can be produced by a process comprising the steps of melting raw materials for any one of the above optical glasses I to IV and directly press-molding a molten glass. Alternatively, the above optical product can be produced by a process comprising the steps of re-heating the above glass preform to a temperature suitable for press-molding (temperature to attain a viscosity of $10^4$ to $10^7$ Pa·s), e.g., approximately 850° C., to soften the preform, and press-molding the preform.

The above processes may include the step of annealing the press-molded article of the glass after the step of directly press-molding a molten glass or after the step of press-molding the glass preform. The above annealing of the molded article of the glass can be carried out at a temperature around the glass transition point thereof, preferably, in a temperature range within ±20° C. from the glass transition point. In the present invention, the temperature for the annealing can be set at 720° C. or lower, and it can be set at a 700° C. or lower for some glass compositions.

In the above manner, optical products such as a lens and a prism can be efficiently produced.

The optical glass of the present invention is a high-refractivity low-dispersion glass having a low temperature for viscous flow as compared with a conventional optical glass. Therefore, the optical glass of the present invention obviates any annealing or re-heat pressing at a particularly high temperature, so that the optical glass can be stably produced.

The present invention will be explained more in detail with reference to Examples, while the present invention shall not be limited by any of these Examples.

EXAMPLES 1-10 AND COMPARATIVE
EXAMPLES 1 AND 2

Powdery raw materials of carbonate, nitrate, hydroxide, oxide, and the like were provided for forming a glass composition shown in each Example in Tables 2 to 4, and the raw materials were fully mixed. Then, the mixture was placed in a platinum crucible, melted in a furnace set at 1,400° C., stirred and refined, and the molten glass was cast into a frame made of iron pre-heated to a proper temperature, maintained at a temperature around Tg for 2 hours and then gradually cooled to give an optical glass.

The thus-obtained optical glasses were measured for properties by the following methods. Tables 2 to 4 also show the results.

(1) Refractive index [nd] and Abbe's number [vd]

An optical glass was produced by cooling a molten glass at a temperature-decreasing rate of 30° C./hour and measured.

(2) Glass Transition Point Tg

An optical glass was measured with a thermo-mechanical analyzer at a temperature elevation rate of 4° C./minute.

(3) Liquidus Temperature [L.T.]

A glass was placed in a platinum crucible having a volume of 50 ml, the crucible with a glass in it was covered and maintained in a furnace at a predetermined temperature for 2 hours and cooled. Then, an inside of the glass was observed through a microscope having a magnification of 100 times, and the liquidus temperature of the glass was determined on the basis of whether or not a crystal was formed. The above temperature was changed at intervals of 10° C.

(4) λ80

A polished sample having a thickness of 10 mm was measured for spectral transmittance, and a wavelength (nm) at a transmittance of 80% was determined.

TABLE 2

| | | Example | | | |
|---|---|---|---|---|---|
| | | 1 | 2 | 3 | 4 |
| Glass Composition (wt %) | $SiO_2$ | 7.3 | 7.3 | 7.3 | 7.3 |
| | $B_2O_3$ | 8.4 | 9.4 | 7.6 | 9.4 |
| | $GeO_2$ | 0 | 0 | 0 | 0 |
| | ($SiO_2 + B_2O_3$) | (15.7) | (16.7) | (14.9) | (16.7) |
| | ($SiO_2 + B_2O_3 + GeO_2$) | (15.7) | (16.7) | (14.9) | (16.7) |
| | ZnO | 2.2 | 5.0 | 11.0 | 5.0 |
| | ($B_2O_3 + $ ZnO) | (10.6) | (14.4) | (18.6) | (14.4) |
| | $La_2O_3$ | 47.8 | 55.8 | 41.6 | 45.8 |
| | $Gd_2O_3$ | 10.0 | 0 | 10.0 | 10.0 |
| | $Y_2O_3$ | 0 | 0 | 0 | 0 |
| | $Yb_2O_3$ | 0 | 0 | 0 | 0 |
| | ($La_2O_3 + Gd_2O_3 + Y_2O_3 + Yb_2O_3$) | (57.8) | (55.8) | (51.6) | (55.8) |
| | $ZrO_2$ | 5.2 | 5.2 | 5.2 | 7.2 |
| | $Ta_2O_5$ | 14.9 | 15.9 | 15.9 | 13.9 |
| | (Sub-total) | (95.8) | (98.6) | (98.6) | (98.6) |
| | $Nb_2O_5$ | 0.8 | 0.8 | 0.8 | 1.2 |
| | $WO_3$ | 0 | 0 | 0 | 0 |
| | $Al_2O_3$ | 2.6 | 0.4 | 0.4 | 0 |
| | $Bi_2O_3$ | 0 | 0 | 0 | 0 |
| | BaO | 0 | 0 | 0 | 0 |
| | SrO | 0 | 0 | 0 | 0 |
| | $Li_2O$ | 0.6 | 0 | 0 | 0 |
| | $Sb_2O_3$ | 0.2 | 0.2 | 0.2 | 0.2 |
| ZnO/($SiO_2 + B_2O_3$) | | 0.140 | 0.299 | 0.738 | 0.299 |
| ($La_2O_3 + Gd_2O_3 + Y_2O_3 + Yb_2O_3$)/($SiO_2 + B_2O_3$) | | 3.682 | 3.341 | 3.463 | 3.341 |
| ($Nb_2O_5 + ZrO_2 + Ta_2O_5$)/($SiO_2 + B_2O_3$) | | 1.331 | 1.311 | 1.470 | 1.335 |
| Properties | Liquidus temperature [L.T.] (° C.) | 1290 | 1280 | 1290 | 1260 |
| | Refractive index [nd] | 1.88 | 1.89 | 1.90 | 1.89 |
| | Abbe's number [vd] | 40.8 | 40.8 | 39.6 | 40.7 |
| | Glass transition point [Tg] (° C.) | 692 | 699 | 689 | 697 |
| | λ80 (nm) | 471 | 450 | 467 | 450 |

TABLE 3

| | | Example | | | |
|---|---|---|---|---|---|
| | | 5 | 6 | 7 | 8 |
| Glass Composition (wt %) | $SiO_2$ | 6.7 | 6.7 | 7.3 | 8.3 |
| | $B_2O_3$ | 10.8 | 10.8 | 8.4 | 9.2 |
| | $GeO_2$ | 0 | 0 | 0 | 0 |
| | ($SiO_2 + B_2O_3$) | (17.5) | (17.5) | (15.7) | (17.5) |
| | ($SiO_2 + B_2O_3 + GeO_2$) | (17.5) | (17.5) | (15.7) | (17.5) |
| | ZnO | 3.2 | 4.5 | 4.5 | 3.2 |
| | ($B_2O_3 + $ ZnO) | (14.0) | (15.3) | (12.9) | (12.4) |
| | $La_2O_3$ | 41.2 | 41.8 | 37.8 | 47.2 |

TABLE 3-continued

|  | | Example | | | |
|---|---|---|---|---|---|
|  | | 5 | 6 | 7 | 8 |
|  | $Gd_2O_3$ | 10.0 | 9.6 | 18.0 | 10.0 |
|  | $Y_2O_3$ | 6.0 | 3.8 | 0 | 0 |
|  | $Yb_2O_3$ | 0 | 0 | 0 | 0 |
|  | ($La_2O_3$ + $Gd_2O_3$ + $Y_2O_3$ + $Yb_2O_3$) | (57.2) | (55.2) | (55.8) | (57.2) |
|  | $ZrO_2$ | 5.2 | 5.2 | 5.2 | 4.2 |
|  | $Ta_2O_5$ | 15.9 | 15.9 | 13.9 | 16.9 |
|  | (Sub-total) | (99.0) | (98.3) | (95.1) | (99.0) |
|  | $Nb_2O_5$ | 0.8 | 1.3 | 0 | 0.8 |
|  | $WO_3$ | 0 | 0 | 1.8 | 0 |
|  | $Al_2O_3$ | 0 | 0 | 1.9 | 0 |
|  | $Bi_2O_3$ | 0 | 0 | 1.0 | 0 |
|  | BaO | 0 | 0 | 0 | 0 |
|  | SrO | 0 | 0 | 0 | 0 |
|  | $Li_2O$ | 0 | 0.2 | 0 | 0 |
|  | $Sb_2O_3$ | 0.2 | 0.2 | 0.2 | 0.2 |
| $ZnO/(SiO_2 + B_2O_3)$ | | 0.183 | 0.257 | 0.287 | 0.183 |
| $(La_2O_3 + Gd_2O_3 + Y_2O_3 + Yb_2O_3)/(SiO_2 + B_2O_3)$ | | 3.269 | 3.154 | 3.544 | 3.269 |
| $(Nb_2O_5 + ZrO_2 + Ta_2O_5)/(SiO_2 + B_2O_3)$ | | 1.251 | 1.280 | 1.217 | 1.251 |
| Properties (° C.) | Liquidus temperature [L.T.] | 1260 | 1250 | 1290 | 1270 |
|  | Refractive index [nd] | 1.88 | 1.88 | 1.88 | 1.88 |
|  | Abbe's number [vd] | 41.2 | 40.9 | 40.5 | 41.0 |
|  | Glass transition point [Tg] (° C.) | 699 | 672 | 707 | 713 |
|  | λ80 (nm) | 443 | 464 | 456 | 450 |

TABLE 4

|  | | Example | | CEx. | |
|---|---|---|---|---|---|
|  | | 9 | 10 | 1 | 2 |
| Glass Composition (wt %) | $SiO_2$ | 5.9 | 6.7 | 9.3 | 9.8 |
|  | $B_2O_3$ | 12.6 | 9.7 | 8.4 | 14.7 |
|  | $GeO_2$ | 0 | 1.5 | 0.5 | 0 |
|  | ($SiO_2 + B_2O_3$) | (18.5) | (16.4) | (17.7) | (24.5) |
|  | ($SiO_2 + B_2O_3 + GeO_2$) | (18.5) | (17.9) | (18.2) | (24.5) |
|  | ZnO | 0 | 3.2 | 0 | 4.5 |
|  | ($B_2O_3$ + ZnO) | (12.6) | (12.9) | (8.4) | (19.2) |
|  | $La_2O_3$ | 41.2 | 42.5 | 43.8 | 36.8 |
|  | $Gd_2O_3$ | 11.0 | 10.0 | 14.0 | 7.6 |
|  | $Y_2O_3$ | 5.0 | 4.0 | 0 | 3.8 |
|  | $Yb_2O_3$ | 2.0 | 0 | 0 | 0 |
|  | ($La_2O_3 + Gd_2O_3 + Y_2O_3 + Yb_2O_3$) | (59.2) | (56.5) | (57.8) | (48.2) |
|  | $ZrO_2$ | 5.4 | 5.2 | 5.2 | 5.2 |
|  | $Ta_2O_5$ | 15.9 | 15.9 | 13.9 | 15.9 |
|  | (Sub-total) | (99.0) | (98.7) | (96.1) | (98.3) |
|  | $Nb_2O_5$ | 0.6 | 0.8 | 0 | 1.3 |
|  | $WO_3$ | 0 | 0 | 1.8 | 0 |
|  | $Al_2O_3$ | 0 | 0 | 1.9 | 0 |
|  | $Bi_2O_3$ | 0 | 0 | 1.0 | 0 |
|  | BaO | 0 | 0.3 | 0 | 0 |
|  | SrO | 0 | 0 | 0 | 0 |
|  | $Li_2O$ | 0 | 0 | 0 | 0.2 |
|  | $Sb_2O_3$ | 0.2 | 0.2 | 0.2 | 0.2 |
| $ZnO/(SiO_2 + B_2O_3)$ | | 0 | 0.195 | 0 | 0.184 |
| $(La_2O_3 + Gd_2O_3 + Y_2O_3 + Yb_2O_3)/(SiO_2 + B_2O_3)$ | | 3.200 | 3.445 | 3.266 | 1.967 |
| $(Nb_2O_5 + ZrO_2 + Ta_2O_5)/(SiO_2 + B_2O_3)$ | | 1.184 | 1.335 | 1.079 | 0.914 |
| Properties | Liquidus temperature [L.T.] (° C.) | 1280 | 1270 | 1290 | 1240 |
|  | Refractive index [nd] | 1.88 | 1.88 | 1.88 | 1.86 |
|  | Abbe's number [vd] | 41.2 | 41.1 | 40.7 | 42.3 |
|  | Glass transition point [Tg] (° C.) | 708 | 707 | 735 | 690 |
|  | λ80 (nm) | 444 | 460 | 460 | 440 |

CEx. = Comparative Example

As shown in Tables 2 to 4, the glasses of the present invention have a refractive index nd of at least 1.875 and an Abbe's number v of at least 39.5, and it is seen that the glasses in Examples 1 to 6 have a glass transition point Tg of 700° C. or lower and that the glasses in Examples 7 to 10 have a glass transition point Tg of 707 to 713° C.

In the glass in Comparative Example 1, the weight ratio of $(Nb_2O_5+ZrO_2+Ta_2O_5)/(SiO_2+B_2O_3)$ is 1.079 or less than 1.2, and the glass has a high glass transition point Tg of 735° C. In the glass in Comparative Example 2, the weight ratio of $(La_2O_3+Gd_2O_3+Y_2O_3+Yb_2O_5)/(SiO_2+B_2O_3)$ is 1.967 or less than 3.1, and the glass has a low refractive index of 1.86.

When the optical glass obtained in Example 6 of the present invention was maintained in an electric furnace at 850° C. for 5 minutes, it was sufficiently softened. The optical glass obtained in Comparative Example 1 was hardly softened. This difference shows that the optical glass of the present invention can be re-heat pressed at a lower temperature than a conventional optical glass.

EXAMPLE 11

Raw materials were melted in a silica crucible or a platinum crucible for forming the glass composition in each of Examples 1 to 10, and glasses were formed. Glass blocks were taken from these glasses and cut to obtain molding glass materials.

Each molding glass material was individually softened under heat until they had a viscosity of $10^4$ to $10^7$ Pa·s, introduced into a mold having a molding surface corresponding to an optically functional surface of an optical product as an end product, and press-molded to give glass molded materials.

Then, the glass molded materials were respectively annealed at glass transition points Tg thereof, to produce optical products.

EXAMPLE 12

Raw materials were melted in a silica crucible or a platinum crucible for forming the glass composition in each of Examples 1 to 10. Each molten glass was respectively adjusted to have a viscosity of at least 0.3 Pa·s and flowed down from a feeder, and a predetermined amount of each glass that had flowed down was cast into a mold and press-molded to give glass molded materials. Then, the glass molded materials were respectively annealed at glass transition points Tg thereof, to produce optical products.

EFFECT OF THE INVENTION

The optical glass of the present invention is a high-refractivity low-dispersion glass having a low temperature for viscous flow, so that it serves to attain stable production of optical products without annealing or re-heat pressing at particularly high temperatures.

What is claimed is:

1. An optical glass which is a borosilicate glass comprising at least one selected from $La_2O_3$, $Gd_2O_3$, $Y_2O_3$ or $Yb_2O_3$ and at least one selected from $ZrO_2$, $Ta_2O_5$ or $Nb_2O_5$, and 0 to 1% by weight $WO_3$, wherein the weight ratio of the total content of $La_2O_3$, $Gd_2O_3$, $Y_2O_3$ and $Yb_2O_3$ to the total content of $SiO_2$ and $B_2O_3$ is from 2 to 4, the weight ratio of the total content of $ZrO_2$, $Ta_2O_5$ and $Nb_2O_5$ to the total content of $SiO_2$ and $B_2O_3$ is from 1 to 2, and the total content of $SiO_2$, $B_2O_3$, $GeO_2$, $ZnO$, $La_2O_3$, $Gd_2O_3$, $Y_2O_3$, $Yb_2O_3$, $ZrO_2$ and $Ta_2O_5$ to over 95% by weight, and the weight ratio of $ZnO/(SiO_2+B_2O_3)$ is more than 0 but less than 2, said optical glass having a refractive index nd of at least 1.875, an Abbe's number vd of at least 39.5 and a glass transition point Tg of 700° C. or lower.

2. The optical glass of claim 1, wherein the weight ratio of ZnO to the total content of $SiO_2$ and $B_2O_3$ is from 0.1 to 0.5.

3. The optical glass of claim 1, which has a glass composition comprising, by % by weight, 3 to 10% of $SiO_2$, 7 to 15% of $B_2O_3$, 0 to 5% of $GeO_2$, 0 to 15% of ZnO, 30 to 60% of $La_2O_3$, 0 to 30% of $Gd_2O_3$, 0 to 10% of $Y_2O_3$, 0 to 5% of $Yb_2O_3$, 2 to 8% of $ZrO_2$ and 13 to 19% of $Ta_2O_5$, wherein the total content of $SiO_2$, $B_2O_3$ and $GeO_2$ is 14 to 20% by weight, the total content of $B_2O_3$ and ZnO is at least 9% by weight, the total content of $La_2O_3$, $Gd_2O_3$, $Yb_2O_3$ and $Yb_2O_3$ is 50 to 60% by weight and the composition contains, by % by weight, 0 to 1% of $Li_2O$ and 0 to 3% of $Nb_2O_5$.

4. The optical glass of claim 3, which contains, by % by weight, 9 to 12% of $B_2O_3$ and 1 to 7% of ZnO and has a $B_2O_3$ and ZnO total content of at least 12% by weight.

5. The optical glass of claim 3, which contains, by % by weight, 6 to 9% of $SiO_2$, 9 to 12% of $B_2O_3$ and 0 to 5% of $GeO_2$ and has an $SiO_2$, $B_2O_3$ and $GeO_2$ total content of 16 to 19% by weight.

6. The optical glass of claim 1, which has a glass composition comprising, by % by weight, 5 to 10% of $SiO_2$, 7 to 13% of $B_2O_3$, 0 to 5% of $GeO_2$, 0 to 15% of ZnO, 30 to 60% of $La_2O_3$, 0 to 30% of $Gd_2O_3$, 0 to 5% of $Y_2O_3$, 0 to 5% of $Yb_2O_3$, 2 to 8% of $ZrO_2$ and 13 to 19% of $Ta_2O_5$, wherein the total content of $SiO_2$, $B_2O_3$ and $GeO_2$ is 14 to 20% by weight, the total content of $B_2O_3$ and ZnO is at least 9% by weight and the total content of $La_2O_3$, $Gd_2O_3$, $Y_2O_3$ and $Yb_2O_3$ is 50 to 60% by weight, and further wherein the total content of the above components exceeds 95% by weight, the composition further contains, by % by weight, 0 to 3% of $Nb_2O_5$, 0 to 1% of $WO_3$, 0 to 3% of $Al_2O_3$, 0 to 3% of $Bi_2O_3$% of $Ga_2O_3$ and 0 to 1% of $Sb_2O_3$, the total content of BaO, SrO, $K_2O$ and MgO is 0 to 3% by weight, and the total content of $Na_2O$, $K_2O$ and $Li_2O$ is 0 to 1% by weight.

7. The optical glass of claim 1, which has a glass composition comprising, by % by weight, 3 to 10% of $SiO_2$, 7 to 15% of $B_2O_3$, 0 to 5% of GeO2, 0 to 15% of ZnO, 30 to 60% of $La_2O_3$, 0 to 30% of $Gd_2O_3$, 0 to 10% of $Y_2O_3$, 0 to 5% of $Yb_2O_3$, 2 to 8% of ZrO2 and 13 to 19% of $Ta_2O_5$, wherein the total content of $SiO_2$, $B_2O_3$ and $GeO_2$ is 14 to 20% by weight, the total content of $B_2O_3$ and ZnO is at least 9% by weight and the total content of $La_2O_3$, $Gd_2O_3$, $Y_2O_3$ and $Yb_2O_3$ is 50 to 60% by weight, and further wherein the total content of the above components exceeds 95% by weight and the glass composition contains 0 to 1% by weight of $Li_2O$ and 0 to 3% by weight of $Nb_2O_5$.

8. The optical glass of claim 7, which contains, by % by weight, 9 to 12% of $B_2O_3$ and 1 to 7% of ZnO and has a total content of $B_2O_3$ and ZnO of at least 12% by weight.

9. The optical glass of claim 7, which contains, by % by weight, 6 to 9% of $SiO_2$, 9 to 12% of $B_2O_3$ and 0 to 5% of $GeO_2$ and has an $SiO_2$, $B_2O_3$ and $GeO_2$ total content of 16 to 19% by weight.

10. A glass preform made of the optical glass recited in claim 1.

11. A process for the production of an optical product, which comprises the steps of softening the glass preform recited in claim 10 under heat and press-molding the glass preform softened under heat.

12. The process of claim 11, which further comprises the step of annealing a glass molded material obtained by the press-molding, after the step of press-molding the glass preform.

13. An optical product made of the optical glass recited in claim 1.

14. A process for the production of the optical product recited in claim 13, which comprises the steps of melting raw materials for a glass and directly press-molding a molten glass.

15. The process of claim 14, which further comprises the step of annealing a glass molded material obtained by the press-molding, after the step of directly press-molding a molten glass.

* * * * *